US006366574B1

(12) United States Patent
Baissus et al.

(10) Patent No.: US 6,366,574 B1
(45) Date of Patent: Apr. 2, 2002

(54) METHOD AND DEVICE FOR RECOVERING SYNCHRONIZATION ON A SIGNAL TRANSMITTED TO A MOBILE-TELEPHONE RECEIVER

(75) Inventors: Eric Baissus, Plascassier (FR); Srinath Hosur, Plano; Anand G. Dabak, Richardson, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/086,689

(22) Filed: May 28, 1998

(30) Foreign Application Priority Data

May 8, 1997 (FR) ............................................. 97 06547

(51) Int. Cl.⁷ ................................................. H04J 3/06
(52) U.S. Cl. ....................... 370/350; 370/514; 370/516; 375/327
(58) Field of Search ................................. 370/350, 445, 370/450, 312, 503, 509–514, 516, 520; 375/233, 150, 240.01, 364, 133, 354, 148, 327; 455/434, 456; 386/96, 110; 712/11; 710/28, 101; 702/6

(56) References Cited

U.S. PATENT DOCUMENTS

| 4,151,485 A | | 4/1979 | Lafratta ...................... 331/1 A |
| 4,506,262 A | | 3/1985 | Vance et al. ............ 340/825.21 |
| 5,373,536 A | | 12/1994 | Dehner, Jr. et al. ......... 375/354 |
| 5,533,025 A | * | 7/1996 | Fleek et al. .................. 370/455 |
| 5,541,967 A | * | 7/1996 | Gluska et al. ............... 375/364 |
| 5,706,057 A | * | 1/1998 | Strolle et al. ................ 348/426 |
| 5,835,532 A | * | 11/1998 | Strolle et al. ................ 375/233 |
| 5,890,068 A | * | 3/1999 | Fattouche et al. .......... 455/456 |
| 5,950,131 A | * | 9/1999 | Vilmur ........................ 455/434 |

FOREIGN PATENT DOCUMENTS

| WO | WO-95/05042 | * | 2/1995 | ............. H04L/5/06 |
| WO | WO 9505042 | | 3/1995 | |

OTHER PUBLICATIONS

Institute of Electrical and Electronics Engineers *abrege*. Hang Z et al. "A New Symbol Synchronizer with Reduced Timing Jitter for QAM Systems" Globecom'95. IEEE Global Telecommunications Congerence, Singapore, Nov. 14–16, 1995, Voltage 2, Nov. 14, 1995, pp. 1292–1296, XP 000622996.*

* cited by examiner

Primary Examiner—Seema S Rao
(74) Attorney, Agent, or Firm—William B. Kempler; Frederick J. Telecky, Jr.

(57) ABSTRACT

Device for recovering synchronization on a signal transmitted to a mobile-telephone receiver, including phase-estimator means (47, 49) for the absolute value (ABS) and the sign (SIGN) of the transmitted signal, estimation processor (64) for processing the output signals of the estimators (47, 49), a sequencer (67), one input of which is connected to the output of the processor (64) and one output of which applies a mode signal to the processor, another output of the sequencer (67) being connected via a sampling-time generator (68) to the sampling-time control inputs of the estimators (47, 49).

18 Claims, 6 Drawing Sheets

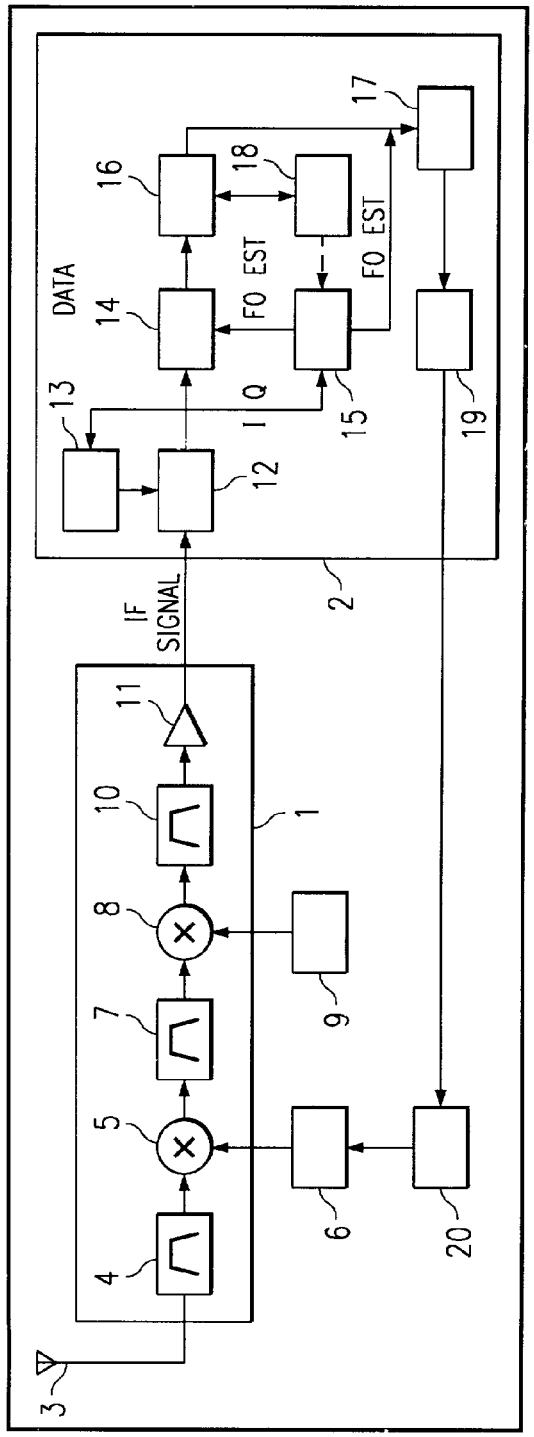

METHOD AND DEVICE FOR RECOVERING SYNCHRONIZATION ON A SIGNAL TRANSMITTED TO A MOBILE-TELEPHONE RECEIVER

BACKGROUND OF THE INVENTION

The present invention relates to a synchronization recovery circuit for an incoherent π/4 QPSK modulator (four-state phase modulation with a jump of π/4) intended for a personal mobile telephone system.

The PHS mobile telephone system currently used in Japan is a time division multiple access/time division duplex (TDMA/TDD) system. Reference may be made to "personal handy phone system" RCR standard, version 1, RCR STD-28 published on Dec. 20, 1993.

It uses a DQPSK modulation scheme with a shift of π/4 at 192 K bauds/s.

Differential detection is used in systems of this type because of low complexity and moderate power consumption requirements In the case of channels where there is Rayleigh fading, differential detection has lower error rate. Reference may be made to the article "Modems for Emerging Digital Cellular-Mobile Radio Systems", IEEE Trans Veh. Tech, volume 40, No. 2, May 1991. In order to achieve a further reduction in the complexity of the receiver, and therefore its power consumption, the received signal is usually demodulated at an intermediate frequency (IF).

The IF signal is discretized, the positive values of the signal being translated into a high level, whereas the negative values are translated into a low level, and differential detection is carried out by using this discretized signal.

Given that the information is contained in the phase of the signal, which does not vary on account of the discretization, this signal can be used for phase detection.

SUMMARY OF THE INVENTION

A general object of the invention is to improve the recovery of the synchronization of the signal reaching a mobile-telephone receiver.

Given that the information is contained in the phase of the signal, which does not vary on account of the discretization, this signal can be used for phase detection.

A general object of the invention is to improve the recovery of the synchronization of the signal reaching a mobile-telephone receiver.

It therefore relates to a method for recovering synchronization on a signal transmitted to a mobile telephone receiver, characterized in that it consists in:

detecting the synchronization packet contained in the transmitted signal,
  acquiring a clock phase in a coarse acquisition mode, during which the synchronization is acquired to within one quarter of the duration of a symbol,
  refining this estimate in a fine acquisition mode, which is a first-order phase-locked loop operation ensuring rapid synchronization acquisition with small final fluctuation.

BRIEF DESCRIPTION OF THE DRAWINGS

The invention will be understood more clearly with the aid of the following description, given solely by way of example and with reference to the appended drawings, in which:

FIG. 1 is a block diagram of a telephone receiver equipped with the means for acquiring synchronization according to the invention;

FIG. 2 is a diagram representing the data interval of the channel dedicated to the protocol of a PHS-type mobile telephone system;

DETAILED DESCRIPTION

Figure 3:
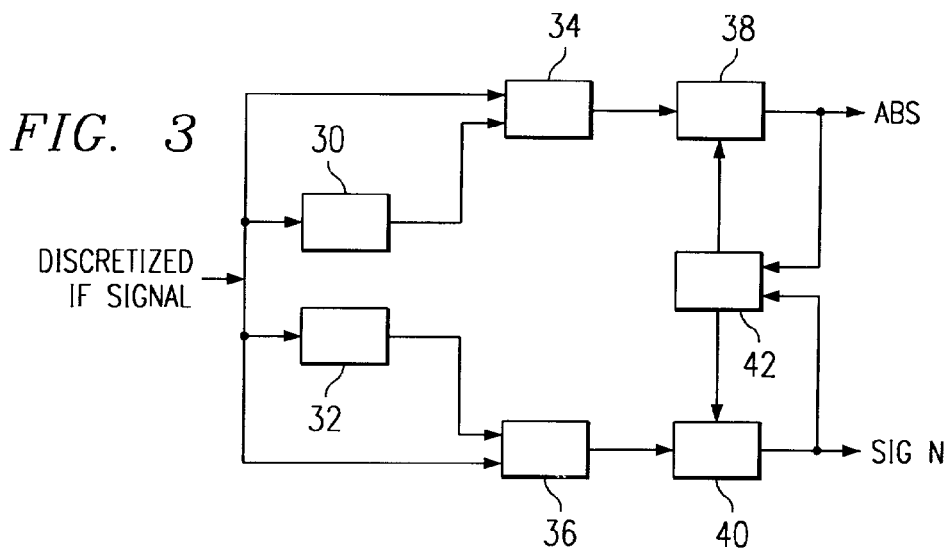
FIG. 3 is a block diagram of the mobile telephone demodulator.

The receiver represented in FIG. 1 has a radio-frequency part 1 and intermediate-frequency IF part 2.

The radio-frequency part 1 has an antenna 3 connected to the input of a filter 4, the output of which is connected to a first input of a first mixer 5.

The latter has a second input connected to the output of a phase-locked loop PLL synthesizer 6.

The output of the mixer 5 is connected to the input of a second filter 7, the output of which is in turn connected to a first input of a second mixer 8.

A second input of this second mixer 8 is connected to the output of a voltage-controlled oscillator VCO 9.

The output of the second mixer 8 is connected to a third filter 10, the output of which is connected; to the input of a discretizer 11.

The output of the second mixer 8 is connected a third filter 10, the output of which is connected; he input of a discretizer 11.

The output of the discretizer 11 is the output of the RF part 1.

It is connected to an input of a phase detector circuit 12, another input of which is connected to the output of a time acquisition circuit 13.

The output of the phase detection circuit 12 is connected to an input of an automatic frequency-offset compensator AFC circuit 14, another input of which is connected to the output of a frequency-offset estimator circuit 15.

The output of the AFC circuit is connected to the input of a data decoder 16.

The output of the decoder 16 is connected to an input of a baseband processor which is also connected to an output of the frequency-offset estimator circuit 15.

The latter is connected to the time acquisition circuit 13.

The data decoder 16 is connected to a detector 18 for a particular data sequence, termed "unique word" UW, which may also be connected to the frequency-offset, estimator circuit 15.

The output of the baseband processor is connected to the input of a digital/analogue converter 19, and the output of the latter is in turn connected to a VTCXO circuit 20, the output of which is connected to the input of the phase-locked loop PPL synthesizer 6.

The phase difference between the successive symbols is measured by using the discretized IF signal.

This phase difference is decoded in order to obtain the transmitted data. However, the phase difference must be measured at a suitable instant in order to ensure correct demodulation.

In the PHS mobile telephone system, 32 synchronization symbols are provided with a view to acquiring the synchronization in the case of the data packet allocated to the protocol (preamble field).

For the sake of simplicity, this packet will be referred to as the synchronization packet.

FIG. 2 shows this data packet.

It contains the fields R, S, PR, UW, DATA and R, which respectively have 4, 2, 62, 32, 124 and 4 bits.

R is the ramp field, PR is the preamble field, S is the start field, which is also referred to as the synchronization field, UW is the field for a particular sequence to be recognized in order to indicate the start of the data (next field), DATA is the data field.

The short length of the field dedicated to the synchronization implies that conventional synchronization recovery for the proposed receiver could take more than one packet with a high probability.

(See "The Theory and Practice of MODEM design" A. C. Bingham, John Wiley & Sons, 1988, for more information regarding hang-ups).

In order to achieve synchronization merely on the basis of the synchronization field, it is proposed to acquire the synchronization in two steps.

During the first step, use is made of a course synchronization estimator in order to acquire the synchronization to within a quarter of this period of the symbol.

During the fine acquisition step, this estimate is refined by using a phase-locked loop PLL with a time-variable loop gain, and the synchronization is acquired with the required accuracy.

Furthermore, since the window for the acquisition is usually opened before the transmitted packet is received, it is necessary to detect the start of the packet in order to recover the synchronization.

A synchronization packet detector is consequently proposed and used.

The sequence of all the synchronization acquisition tasks will be described below.

FIG. 3 represents a PHS-system demodulator architecture.

The input of the demodulator receives a discretized intermediate-frequency signal.

This IF signal is applied to a symbol delay circuit 30 and to a phase-shift and delay circuit 32, as well as the first inputs of EXCLUSIVE-OR gates 34, 36, the second inputs of which respectively receive the output signals of the circuits 30 and 32.

The outputs of the EXCLUSIVE-OR gates 34, 36 are connected respectively to the inputs of the corresponding phase-measurement circuits 38, 40, which also have inputs by means of which they are connected to a synchronization generator 42.

The outputs of the phase-measurement circuits 38, 40 are fed back to the inputs of the synchronization generator 42.

The output of the phase measurement circuit 38 delivers an ABS signal.

The output of the phase measurement circuit 40 delivers an SIGN signal.

The ABS and SIGN signals are reinjected into the synchronization generator circuit 42.

The input signal of the discretized demodulator is delayed by the period of one symbol in the circuit 30, and delayed and phase-shifted by 90° in the circuit 32.

The time differences between the leading and trailing edges of the input signal of the demodulator and of the delayed and phase-shifted signals are then measured by using a known clock.

This time information, measured in "ticks" (each tick is the period $T_{clk}$ of this clock) directly gives the differentially encoded phase, which is then used to obtain the transmitted data.

Since there are a number of intermediate-frequency IF cycles in a single symbol time $T_{sym}$, the exact synchronization phase at which this measurement needs to be triggered must be estimated.

Figure 4:
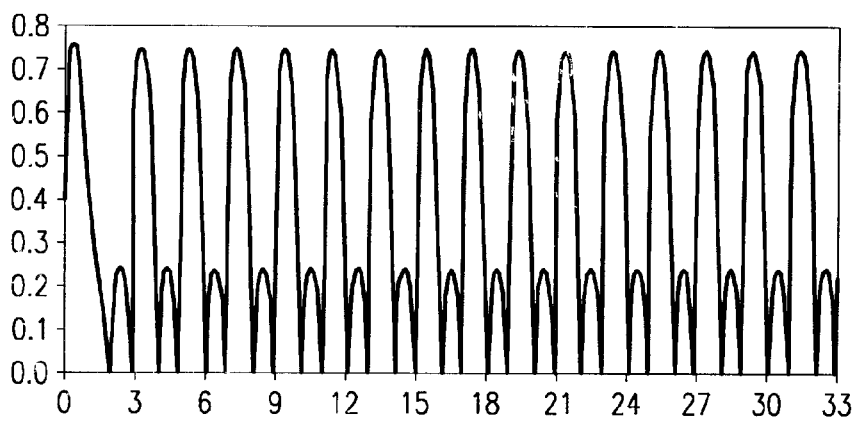
FIG. 4 is a diagram of the absolute value signal ABS for the synchronization packet.

The signals at the output of the demodulator, which are obtained with the synchronization field as input, are represented in FIG. 4 for various values of synchronization offset.

It will be noted that the phase values are a maximum for a zero offset, namely the exact sampling instant.

It will be noted that these signals are not quantized, that is to say it has been assumed that the time offset could be measured with infinite accuracy.

In reality, these signals are quantized and the quantization depends on the clock period $T_{clk}$.

Figure 5:
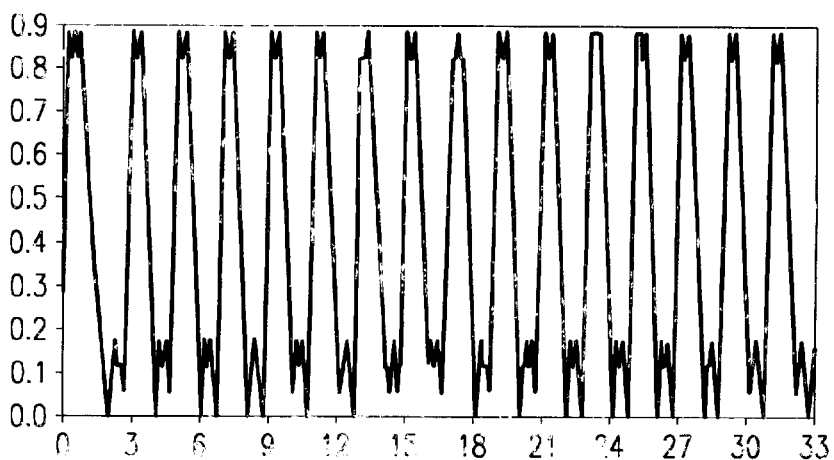
FIG. 5 is a diagram representing the quantized signal ABS.

The, quantized signals for the current system are also represented in FIG. 5.

The term ABS will be used below to denote the estimate of the phase difference between the signal and the delayed in-phase component, and the term SIGN will be used to denote the estimate of the phase difference between the signal and its delayed quadrature signal.

The implementation of the synchronization acquisition proposed according to the invention will now be described.

The purpose of the synchronization acquisition is to estimate the time offset between the current Sampling time and the input of the demodulator.

This estimate is then delivered to the sampling Time generator.

The various steps involved in the synchronization acquisition will be described below.

The synchronization-error estimation means used for fine acquisition will firstly be discussed, and the problem of the presence of an erroneous equilibrium position, leading to sampling offset by one half-period, will be underlined.

This phenomenon makes it necessary to have a coarse mode.

The coarse time acquisition employed according to the invention will be described secondly.

Lastly, a means is proposed for using a coarse-mode estimator in order to detect the start of a synchronization packet.

The basic concept for fine time acquisition is to oversample the value of the phase in order to calculate an estimator correlated with a time error.

The decision was made to use only two samples per symbol in order to reduce the complexity of the circuits as far as possible.

Although any equally spaced samples may be chosen, it is observed that good results are obtained when using samples spaced apart from one another at intervals of $T_{sym}/4$, that is to say if the middle of a sample lies at the correct sampling instant, $T_{samp}=0$, the other two samples are at:

$$T_{samp-left} = -T_{sym}/4$$

and $$T_{samp-right} = T_{sym}/4.$$

Figure 6:
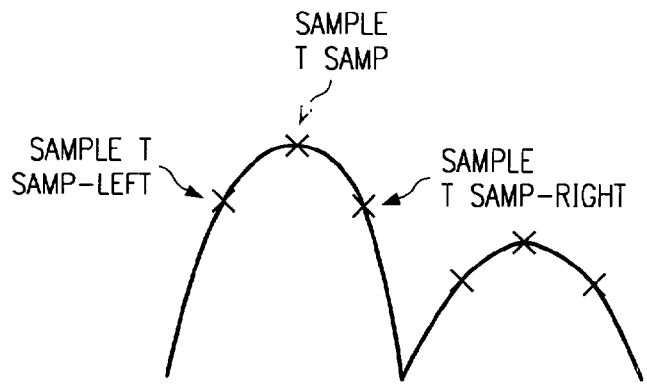
FIG. 6 shows a diagram of the sampling times for calculating the phase error for the fine loop.

The sampling instants are represented in FIG. 6 in the case of perfect time synchronization.

This figure shows the sampling instants intended for calculating the phase error for a fine loop.

It will be noted that the ABS and SIGN signals are two periodic symbols.

Consequently, with the object of having the synchronization estimator invariance with respect to the real synchronization offset, two symbols (four samples/estimator) are considered together.

It will be noted that any even number of symbols considered at an instant leads to invariance in the synchronization estimation.

However, increasing the number of symbols for estimating the synchronization offset will increase the delay, and this may in turn lead to unstable operation of the fine-mode synchronization acquisition loop.

Let a(T) and s(T) be the samples of the ABS and SIGN signals at the instant T, respectively.

The synchronization error estimator firstly calculates the errors $e_{abs}$, and $e_{sign}$ as follows.

$$e_{abs}=(a(T_{samp-left})-a(T_{samp-right}))+(a(T_{samp-left}+T_{sym})-a(T_{samp-right}+T_{sym}))$$

$$e_{sign}=(s(T_{samp-left})-s(T_{samp-right}))+(s(T_{samp-left}+T_{sym})-s(T_{samp-right}+T_{sym}))$$

It will be noted that, because of the similarity of the ABS and SIGN signals, $e_{abs}$ and $e_{sign}$ should be the same when there is no noise or quantization. However, the use of these two estimates is advantageous in the presence of noise.

Figure 7:
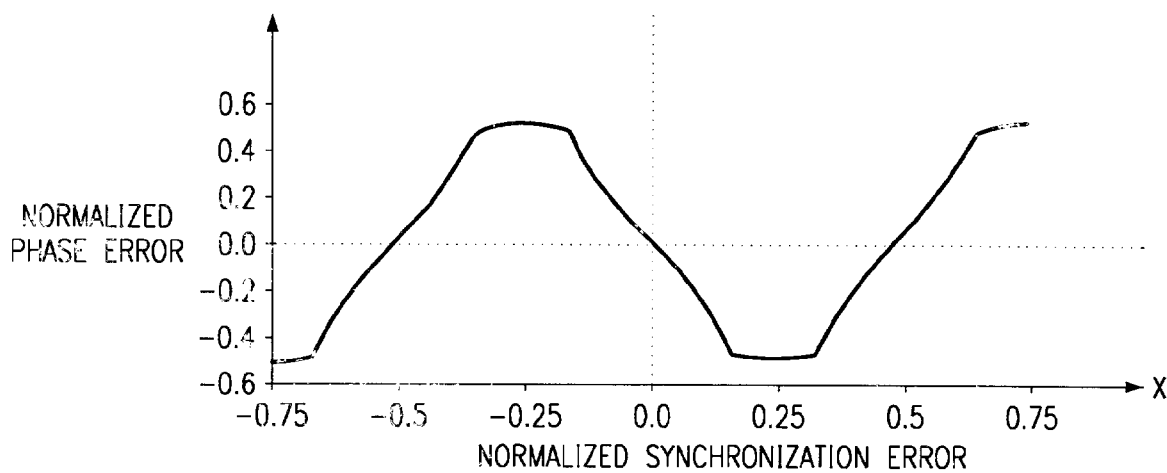
FIG. 7 is a diagram representing the normalized phase error as a function of the synchronization error in the sampling.

FIG. 7 shows the normalized phase error as a function of the synchronization error in the sampling.

In order to avoid ambiguities with another synchronization estimator, $e_{abs}$ and $e_{sign}$ will be referred to as the phase error estimators.

FIG. 7 shows the phase errors for various synchronization offsets, when $T_{samp-right}=T_1+T_{sym}/4$ and $T_{samp-left}=T_1-T_{sym}/4$.

It can be seen according to this figure that the phase error curve cuts the x axis with a positive slope each time the synchronization error is $\pm T_{sym}/2$.

This means that when the real sampling value is offset with respect to the ideal value by $\pm T_{sym}/2$, erroneous equilibrium positions may be reached. In other words, when $T_1$ is offset by about $\pm T_{sym}/2$ with respect to the real sampling instant, the fine loop needs a much longer time to converge.

The most unfavourable case would be sampling exactly at $\pm T_{sym}/2$.

Ideally, the calculated phase error would then be 0, even though the sampling ought to be performed one half-period later. The synchronization would then be locked at this erroneous position. There is consequently a need for the coarse acquisition to correct the synchronization coarsely in an interval of $\pm T_{sym}/4$ of the sampling instant.

It will be assumed below that, in the fine load, the initial synchronization offset is between $-T_{sym}/4$ and $+Ts_{ym}/4$ around the perfect sampling position.

In this range of synchronization offsets, the phase error estimate has a very advantageous form and makes it possible to estimate the real time offset accurately.

Combinatorial logical or a ROM memory is used to store the phase error relative to the synchronization offset, and a good estimate of the synchronization offset is thus obtained.

Because of noise and quantization, the error signals $e_{abs}$ and $e_{sign}$ are in general different. Thus, by using the average value of $e_{abs}$ and $e_{sign}$ to obtain the synchronization offset, or by using the average value of the synchronization offsets obtained on the basis of using $e_{abs}$ and $e_{sign}$, a reduction in the synchronization fluctuation is achieved. It is observed that the two methods for estimating the synchronization offset $\tau_{off}$ lead to final synchronization fluctuations which are equal.

However, the first method is preferred because it leads to only one ROM access.

Figure 8:
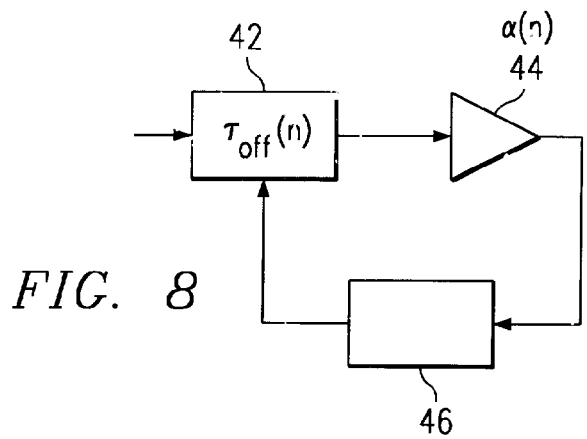
FIG. 8 is a diagram of the fine acquisition loop.

The estimated synchronization offset is then used in a standard first-order loop represented in FIG. 8. The gain $\alpha$ is referred to as the loop gain.

The loop represented in FIG. 8 comprises a circuit 42 for estimating the offset $\tau_{off}$, the output of which is connected to the input of an amplifier 44 with gain $\alpha(n)$. The output of the amplifier 44 is fed back to a control input of the estimator 42 via an accumulator 46.

For high values of the loop gain, the convergence is faster but the final synchronization fluctuation is also high, whereas for lower values, the loop converges slowly.

It is consequently proposed to use a variable value of the loop gain $\alpha$. The values of $\alpha$ are chosen such that they are implemented readily in hardware form without needing multipliers.

The following table shows an example of successive values of $\alpha n$.

| $\alpha_1$ | $\alpha_2$ | $\alpha_3$ | $\alpha_4$ | $\alpha_5$ | $\alpha_6$ | $\alpha_7$ | $\alpha_8$ | $\alpha_9$ | $\alpha_{10}$ |
|---|---|---|---|---|---|---|---|---|---|
| 3/4 | 3/4 | 1/2 | 1/2 | 1/4 | 1/4 | 1/4 | 1/4 | 1/8 | 1/8 |

Figure 9:
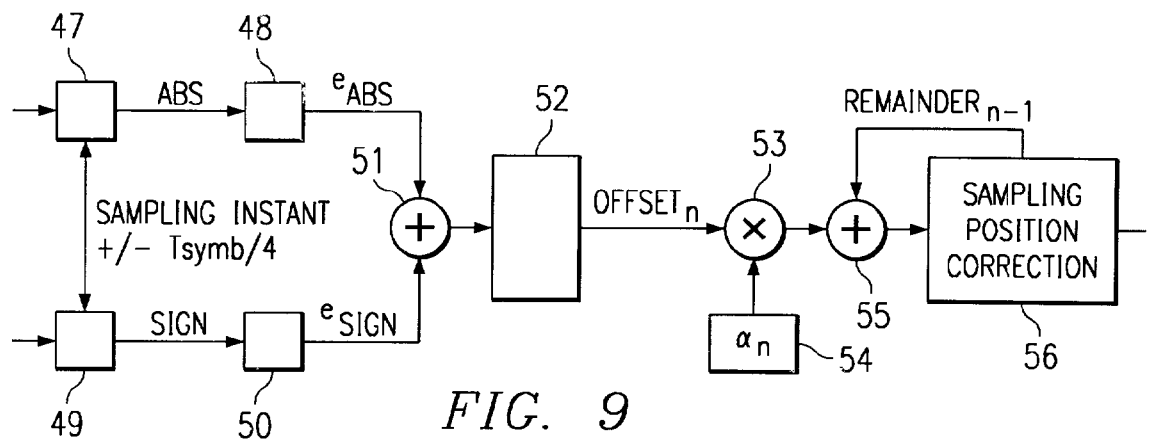
FIG. 9 is a block diagram of the implementation of the fine acquisition.

A block diagram of one possible way of implementing a fine-mode acquisition device is represented in FIG. 9.

This acquisition device has a first phase estimator 47 for the absolute value ASS signal, the output of which is connected to the input of a fine-mode estimator 48, at the output of which an error signal $e_{abs}$ appears.

It has a second phase estimator 49 for the SIGN signal, the output of which is connected to the input of a fine-mode estimator 50, at the output of which an error signal $e_{sign}$ appears.

The first and second estimators 47 and 49 each have a control input, to which a sampling time signal is applied: $\pm T_{syn}/4$.

The outputs of the fine-mode estimators 48 and 50 are connected to the inputs of a first adder 51, the output of which is connected to an input of a ROM memory 52.

The latter may be replaced by combinatorial logic.

At the output of the ROM 52, an offset$_n$ signal appears which is applied to an input of a second adder 53, which on another input receives the signals corresponding to the loop gain values $\alpha_n$ stored in a table 54.

The output of the second adder 53 is connected to an input of a third adder 55, the output of which is connected to an input of an offset-correction circuit 56. The latter receives a correction signal on another input, and delivers at its output a signal Rest$_{n-1}$ which is applied to another input of the third adder.

Given that the result delivered by the loop is not a whole number, only an integer part of the estimate is delivered to the sampling time generator unit.

The rest of the estimate is accumulated in order to obtain better final precision.

The coarse acquisition will now be described.

The object of the coarse acquisition is to indicate whether the current sampling time lies in the range between $-T_{symb}/4$ to $+T_{symb}/4$ relative to the perfect sampling instant. If this is not the case, the coarse mode offsets the sampling time by $T_{symb}/2$.

In order to fulfil this function, use is made of the following estimator:

$$e\ (to,\ \tau) = ABS\ (\tau) - ABS\ (\tau + T_{symb}) - [SIGN\ (\tau) - SIGN\ (\tau + T_{symb})]$$

in which:

to is the real time offset between the sampling time of the demodulator and the perfect sampling time, $\tau$ is the offset between the sampling time of the demodulator and the sampling position intended for calculating e.

Figure 10:
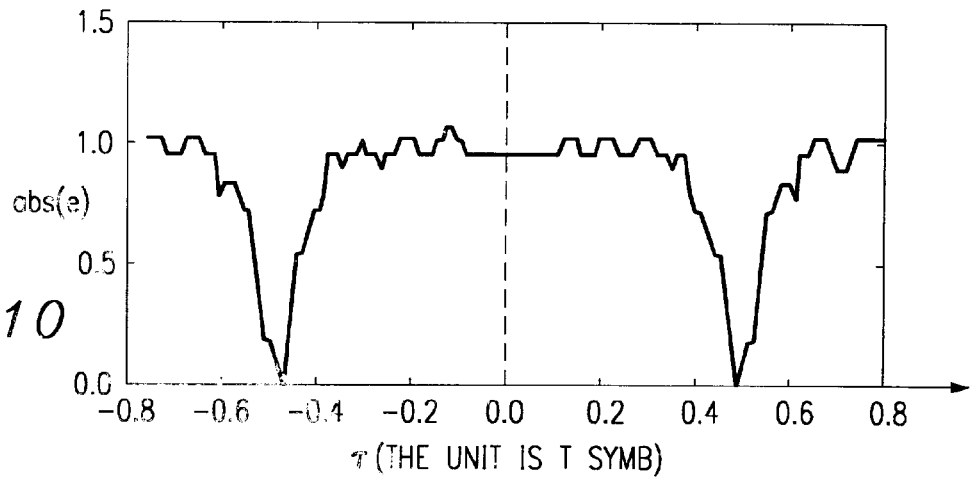
FIG. 10 is a diagram representing the course acquisition signal as a function of the offset of the sampling time.

FIG. 10 shows the curve of the signal abs (e (to, $\tau$=0)) relative to the offset of the sampling time.

The function e (to, $\tau$) is at its maximum when the time offset error is equal to $\tau$.

It is possible to define a threshold TH coarse and a function H (to, $\tau$) as:

H (to, $\tau$)=1 when abs (e (to, $\tau$))>TH coarse

H (to, $\tau$)=0 when abs (e (to, $\tau$))<TH coarse

Figure 11:
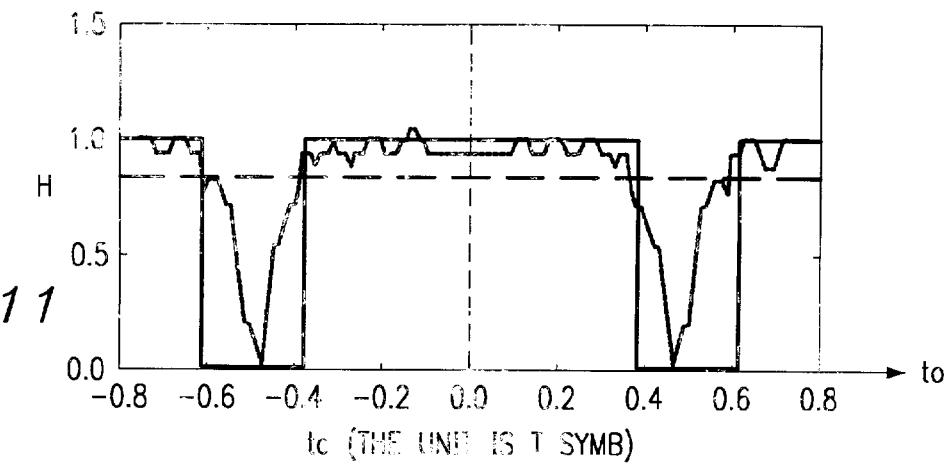
FIG. 11 represents the discretization function $H(t0, \tau=0)$ for the function $e(t0, \tau=0)$ of the acquisition signal in FIG. 10.

H is represented in FIG. 11.

By modifying $\tau$, e (to,$\tau$) and H (to,$\tau$) are offset relative to the abscissa axis to.

E (to, $\tau_1$, $\tau_2$)=H (to, $\tau_1$) AND H (to, $\tau_2$) are defined with $r_1$ and $\tau_2$ such that: E is equal to one when the real offset lies in the range $\pm T_{symb}/4$ and is equal to zero everywhere else. E is directly used to indicate whether an offset $T_{symb}$ for a sampling position is necessary.

When E is equal to 0, the time offset is greater than $T_{symb}/4$. Half of $T_{symb}$ is thus added to the sampling time in order to obtain a time offset less than $T_{symb}/4$.

Application values will now be given.

$\tau_1$ is of the order of $+T_{symb}/8$ and $\tau_2$ is of the order of $T_{symb}/8$.

Figure 12:
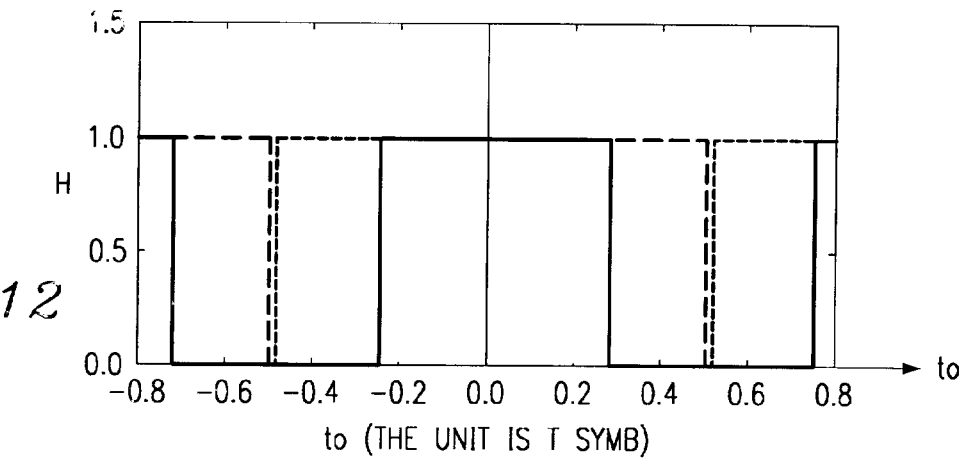
FIG. 12 represents the course-mode offset indicator.

With this value, E(to, T/8,-T/8) is given in FIG. 12, which represents the coarse-mode offset indicator.

TH coarse, $\tau_1$ and $\tau_2$ are optimized in order to reduce the probability of a false decision as far as possible (that is to say the offset of $T_{symb}/2$ when the real synchronization offset is in the correct range).

Three pairs of symbols are actually used in order to estimate e(t), as will be explained below.

An implementation example for the calculation of E will be described with reference to FIG. 13.

The circuit represented in this figure comprises the phase estimators 47 and 49 in FIG. 9, at the outputs of which inputs of a coarse-mode estimator 58 are connected. Signals $e_1$ and $e_2$, respectively, appear at the outputs of the estimator 58. These outputs are connected to the inputs of TH-coarse threshold circuits 59 and 60. The outputs of these threshold circuits are connected to an AND gate 61 which, at its output, delivers a signal corresponding to the value E.

The packet detection will now be described with reference to FIG. 14.

Given that the window for the acquisition is usually opened before the packet to be demodulated is transmitted, a packet detector is needed for triggering the coarse and fine acquisitions. The packet can be detected easily by using the average of the values $e(\tau_1)$ and $e(\tau_2)$.

Each time the average absolute value of $e(\tau_1)$ and $e(\tau_2)$ cuts a threshold, TH-noise, a packet can be declared present.

In order to make this decision more efficient, use is made of a plurality of successive values e which are averaged.

The probability of a false alarm or false decision (that is to say declarations that a packet is present when it actually is not and the non-detection of a packet when it is actually present) depends on the number of values e used.

The probability of a false alarm for a certain threshold depends in turn on the variance of the noise, whereas the probability of a false decision depends only on the threshold. Using an average reduces the variance of the estimates and thus makes it possible to obtain a lower probability of false alarm and false decision.

However, this means a smaller number of symbols for the fine acquisition step, leading to a higher possible error at the end of synchronization.

A compromise should be found between the number of symbols used by the coarse mode and the number of symbols used by the fine mode, in order to obtain the best possible results (low probability of false alarm 30 and false decision, low variance of the final synchronization result).

Figure 13:
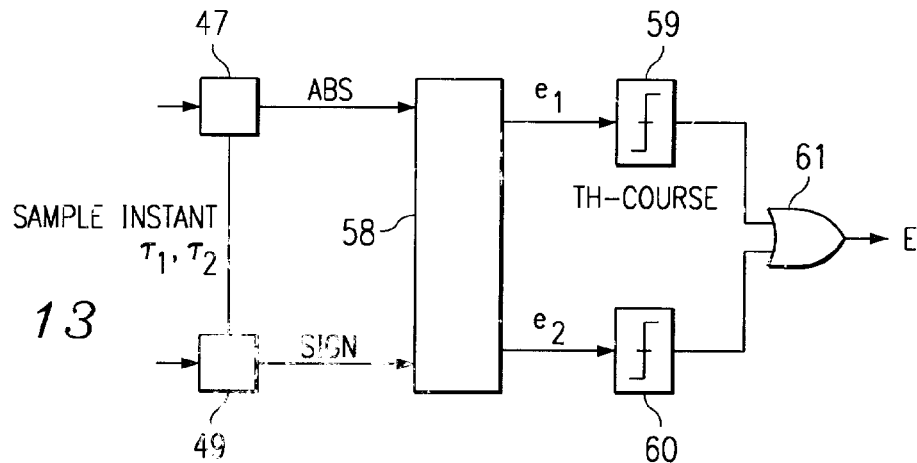
FIG. 13 is a block diagram of the means for calculating the course-mode offset indicator E.
Figure 14:
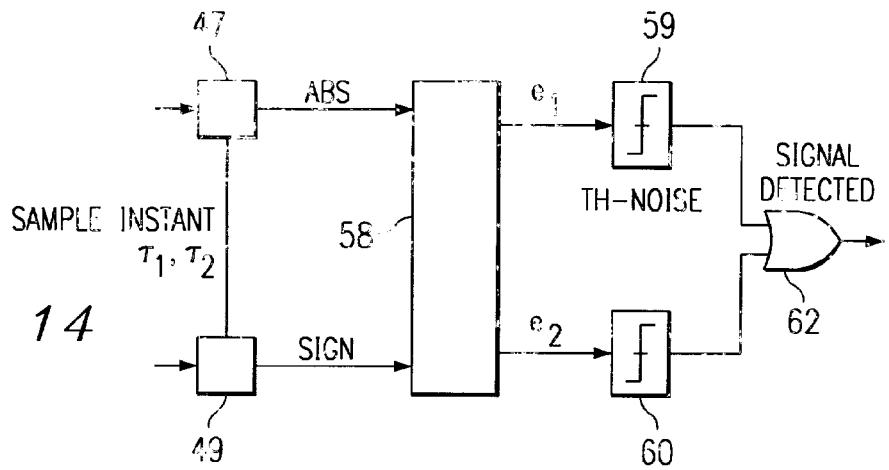
FIG. 14 is a diagram representing the circuit for detecting the synchronization packet.

FIG. 14, which represents a diagram relating to the packet detection, is similar to FIG. 13 apart from the fact that the threshold circuits 59 and 60 are circuits using the noise threshold TH-noise and are connected to an OR gate 62.

An explanation will be given below of the general state machine used in the time acquisition in order to reduce the impact of a false decision to a minimum. The efficiency of this machine is as important as the efficiency of the coarse and fine modes in the final efficiency of the time acquisition.

The synchronization acquisition sequencing will now be described.

Various state machines can be used depending on the demodulation conditions. To adopt the worst possible case, it will be assumed that the demodulator has no knowledge of when the packet is to arrive. It will also be assumed that the "packet not present" time may be very long, so that the sequencer often makes a false detection and needs to reset itself very quickly so as not to miss the packet.

Figure 15:
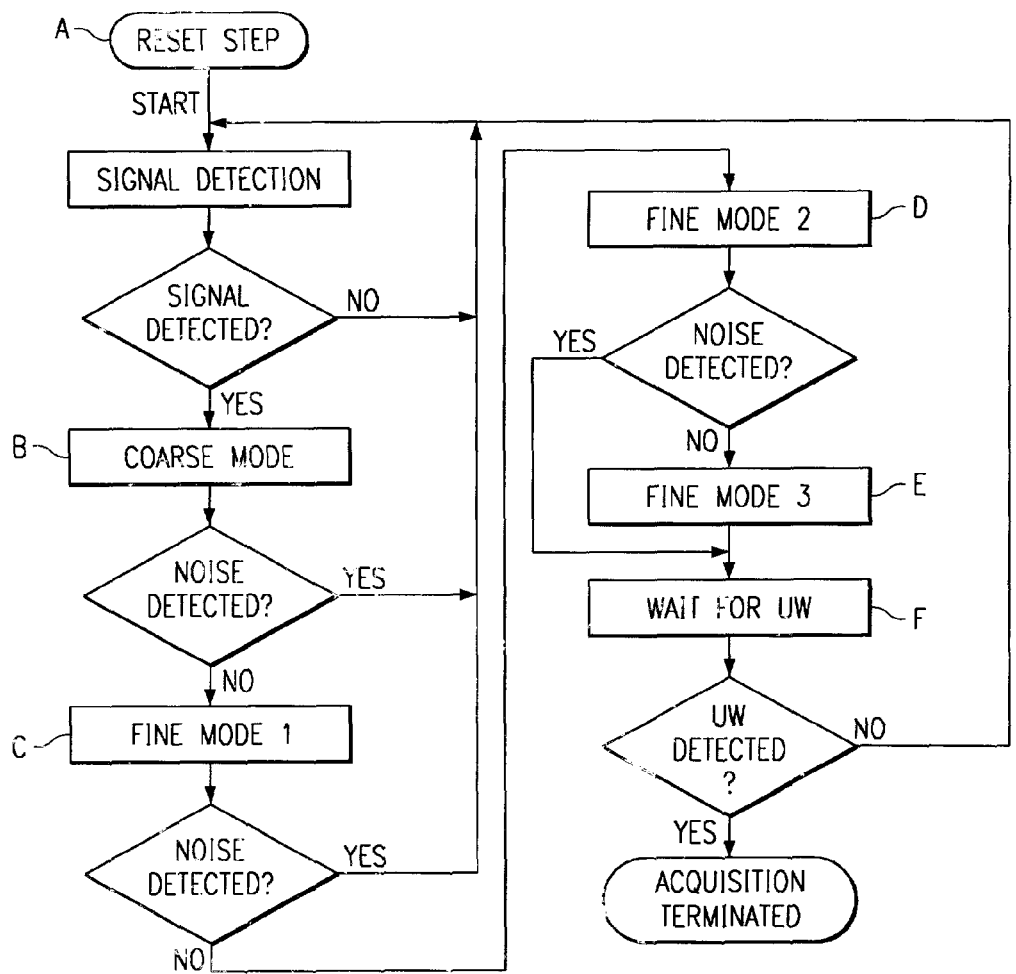
FIG. 15 is a flowchart of the synchronization; acquisition sequence according to the invention.

In FIG. 15 the first step of the state machine used for the synchronization is the step A of detecting the signal. Use is made of the coarse estimator over 4 symbols. The choice of the noise threshold value is a compromise between the probability of false alarm and the probability of non-detection. The noise threshold is chosen so that the probability of false alarms is around 10%, whereas the probability of packet non-detection is about 1%. Indeed, it seems preferable to accept the false alarms, given that the noise will if appropriate be detected during the following steps of the synchronization. Conversely, it is highly detrimental not to detect a packet, because this means that at least four symbols of the synchronization field have been lost.

The second step is the coarse estimation step B. The results of the signal detection step A are not used in the coarse estimation so as to be sure that the coarse estimate is made over the field PR and not over the bits of the field R (which would lead to a false decision). Use is made of the coarse estimator over six symbols, and a new coarse threshold is chosen in order to reduce the probability of false decision to a minimum.

At the same time, the results of the coarse estimator are compared with the noise threshold. False packet detection can then be identified.

The third step is the fine estimation step C. The fine estimate is firstly made over eight symbols. During these first eight symbols, a noise estimate is also made in order to identify a false packet detection.

The fine estimate is then made during a step D over eight other symbols. During these eight new symbols, the noise estimate is also made. However, it is usual, when this estimate indicates noise, for this to mean that the synchronization acquisition is late and it takes place outside the synchronization field. In this case, the fine estimation is stopped.

Four symbols of the synchronization field are normally left in order, during a step E, to improve the accuracy of the fine estimate if it is assumed that the first and last symbols are corrupted by the neighbouring symbols.

Throughout the fine mode, the ABS and SIGN signals are sampled (in the central position between $-T_{symb}/4$ and $+T_{symb}/4$) and the UW field of the synchronization packet is looked for. This is useful when the synchronization is late, so that the first bits of the UW field are not lost.

At the end of the time acquisition, during the phase F, the state machine waits for the UW detection. If, after a certain time, the UW field has still not been detected, the state machine is reset to zero.

Figure 16:
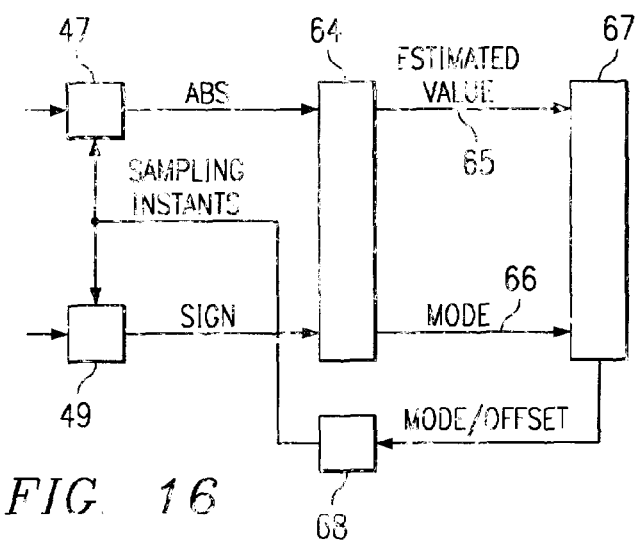
FIG. 16 is a diagram representing the implementation of the synchronization acquisition according to the invention.

FIG. 16 represents a block diagram of the implementation of the synchronization.

The time acquisition circuit includes the phase estimators 47 and 49, which bear the same reference numbers as those already represented in FIGS. 9 and 13 and whose ABS and SIGN outputs are connected to two inputs of an estimation processor 64 which has an estimate value output 65 and a mode input 66, respectively connected to a corresponding input and output of a sequencer 67, another output of which is connected to a mode-change input of a sampling time generator 68. The output of this generator is connected to the respective sampling-time control inputs of phase estimators 47 and 49. The estimate processor unit 64 calculates the estimate value belonging to a defined number of symbols according to the mode defined by the sequencer 67, as explained above.

The sampling time generator 68 generates the sampling time according to the mode defined by the sequencer 67 (coarse, fine, no acquisition).

In the coarse mode, for example, it generates two sampling times per symbol at the positions $\tau_1$ and $\tau_2$ starting from the normal sampling time. The sampling positions can be offset according to the offset value of the sequencer. One embodiment of the sampling time generator 68 involves using a counter which has a periodicity $T_{symb}$ and the initial value of which can be increased or decreased according to the value of the offset.

Numerous simulations and tests on circuits have confirmed the performance of this synchronization acquisition system. The probability of non-detection for the UW field and the variance of the result of the synchronization were used to quantify the performance of this system.

The results show that, for an $E_b/N_O$ of 8 dB, the probability of not detecting the data packet was less than 0.009.

The variance of the synchronization result was less than $0.02615T_{sym}$. Experiments were also carried out while introducing a frequency error in the demodulator. The performance of the simple first-order loop proved satisfactory for deviations of up to 9 ppm.

The novel synchronization acquisition system for a mobile receiver which has just been described is in accordance with the standards for mobile personal telephone systems. The algorithm firstly performs packet detection and coarse acquisition followed by fine acquisition. The design of the synchronization phase detectors, the associated synchronization loops and the synchronization acquisition method took the implementation details into consideration. In particular, they were designed so as to be produced easily in the form of circuits and to consume as little power as possible. The fine acquisition loop is novel insofar as it uses a time-varying loop gain. The algorithm has also proved robust in terms of discrepancies in the modulation frequency. Finally, the sequencing of these modes (coarse, fine) has been described. Very good robustness with regard to false alarms and wrong decisions has been demonstrated.

What is claimed is:

1. Method for recovering synchronization on a signal transmitted to a mobile-telephone receiver, comprising the steps of:

detecting a synchronization packet contained in the transmitted signal;

acquiring a clock phase in a coarse acquisition mode, during which the synchronization is acquired to within one quarter of the duration of a symbol, refining an estimate in a fine acquisition mode, which is a first-order phase-locked loop operation ensuring rapid synchronization acquisition with small final fluctuation, wherein the fine estimation step is firstly carried out on a first group of symbols, during which a noise estimate is also made with a view to detecting false signals, then on another group of symbols, during which the nose estimate is also made in order to determine whether the synchronization acquisition is late and takes place outside the synchronization field, in which case the estimation step is stopped, and finally on the remaining number of symbols in order to improve the precision of the fine estimate.

2. Method according to claim 1, herein the phase-locked loop has variable gain.

3. Method according to claim 1, wherein the phase-locked loop has fixed gain.

4. Method according to claim 1 wherein the synchronization packet is detected by choosing a noise threshold which is a compromise between the probability of false alarm and the probability of nondetection.

5. Method according to claim 4, wherein during a coarse estimation step, it is ensured that an estimate is made on a preamble field PR of the transmitted signal, the coarse estimate is made over a minimum number of symbols and a coarse threshold is chosen in order to reduce false decisions to a minimum.

6. Method according to claim 5, wherein the results of the coarse estimate are compared with a noise threshold in order to detect a possible false signal.

7. Method according to claim 1, wherein during the coarse estimate and the fine estimate, the phase value of a received signal is oversampled in order to calculate an estimator correlated with the synchronization error.

8. Method according to claim 7, wherein during the fine estimate, consideration is simultaneously given to an even number, at least equal to two, of symbols resulting from the sampling of absolute-value (ABS) and sign (SIGN) signals of the received signal.

9. Method according to claim 8 wherein in order to make the coarse acquisition, use is made of an estimator:

e (to, τ)=ABS (τ)−ABS(τ+$T_{symb}$)−[SIGN(τ)−SIGN (τ+$T_{symb}$)] in which:
to is the real time offset between a sampling instant, of the demodulator and an ideal sampling instant,
τ is the offset between the sampling instant of the demodulator and the sampling position used to estimate e.

10. Method according to claim 7 wherein the synchronization-error calculation employs the calculation of errors $e_{abs}$ and $e_{sign}$ on the absolute-value (ABS) and sign (SIGN) signals according to the following equations:

$$e_{abs}=(a(T_{samp\text{-}left})-a(T_{samp\text{-}right}))+(a(T_{samp\text{-}left}+T_{sym})-a(T_{samp\text{-}right}+T_{sym}))$$

$$e_{sign}=(s(T_{samp\text{-}left})-s(T_{samp\text{-}right}))+(s(T_{samp\text{-}left}+T_{sym})-s(T_{samp\text{-}right}+T_{sym}))$$

in which:
a (T) and s (T) are the samples of the ABS and SIGN signals at instant T, respectively,
$T_{sym}$ is the duration of a symbol,
$T_{samp\text{-}left}$ and $T_{samp\text{-}right}$ are respectively the instants of a sample lying to the left and to the right of the centre of a sample located at the correct sampling instant $T_{samp}$=0.

11. Method according to claim 7 wherein an estimated synchronization offset is used in a first-order phase-locked loop.

12. Method according to claim 2 wherein the synchronization packet is detected by choosing a noise threshold which is a compromise between the probability of false alarm and the probability of non-detection.

13. Method according to claim 3 wherein the synchronization packet is detected by choosing a noise threshold which is a compromise between the probability of false alarm and the probability of non-detection.

14. Device for recovering synchronization on a signal transmitted to a mobile-telephone receiver, comprising means for detecting a synchronization packet contained in the transmitted signal, means for acquiring a clock phase in a coarse acquisition mode, during which the synchronization is acquired to within one quarter of the duration of a symbol, and means for fine-mode, first-order phase-locked loop acquisition, ensuring rapid synchronization acquisition with small final fluctuation, wherein the means for detecting the synchronization packet contained in the transmitted signal comprise a first phase estimator for an absolute value, a second estimator for a sign signal, the outputs of the first and second estimators being connected to a coarse-mode estimator delivering error signals at its outputs, noise-threshold thresholding circuits connected to the outputs of the coarse-mode estimator and an OR gate which is connected to the outputs of the thresholding circuits and delivers a signal corresponding to the detection of the synchronization packet.

15. Device according to claim 14, wherein the means for clock-phase acquisition in coarse-acquisition mode comprise the first and second phase estimators, for the absolute value and the sign, the coarse-mode estimator whose outputs for the error signals are connected to coarse-threshold thresholding circuits, the outputs of the thresholding circuits being connected to an AND gate delivering, at its output, a deviation signal relating to a sampling instant.

16. Device according to claim 14 wherein the fine-mode acquisition means comprise the first and second phase estimators for the absolute value and the sign of the transmitted signal, with each of which estimators a third and a fourth fine-mode estimator is associated, a first adder for the absolute-value and sign error signals output by the third and fourth fine-mode estimators, a means for storing the values of he output signals of the first adder, this means delivering an offset signal at its output, a second adder adding the offset signal with a gain given by a gain table and the third adder adding the output signals of the second adder with the output signals of an offset-correction circuit whose input is connected to the output of the third adder.

17. Method for recovering synchronization on a signal transmitted to a mobile-telephone receiver, comprising the steps of:
detecting a synchronization packet contained in the transmitted signal;
acquiring a clock phase in a coarse acquisition mode, during which the synchronization is acquired to within one quarter of the duration of a symbol,
refining an estimate in a fine acquisition mode, which is a first-order phase-locked loop operation ensuring rapid synchronization acquisition with small final fluctuation, wherein the phase-locked loop has variable gain, the synchronization packet is detected by choosing a noise threshold which is a compromise between the probability of false alarm and the probability of non-detection, and
wherein a fine estimation step is firstly carried out on a first group of symbols,
during which a noise estimate is also made with a view to detecting false signals, then on another group of symbols, during which the noise estimate is also made in order to determine whether the synchronization acquisition is late and takes place outside a synchronization field, in which case the estimation step is stopped, and finally on the remaining number of symbols in order to improve the precision of the fine estimate.

18. Method for recovering synchronization on a signal transmitted to a mobile-telephone receiver, comprising the steps of:
detecting a synchronization packet contained in the transmitted signal;
acquiring a clock phase in a coarse acquisition mode, during which the synchronization is acquired to within one quarter of the duration of a symbol,
refining an estimate in a fine acquisition mode, which is a first-order phase-locked loop operation ensuring rapid synchronization acquisition with small final fluctuation, wherein the phase-locked loop has variable gain, wherein the synchronization packet is detected by choosing a noise threshold which is a compromise between the probability of false alarm and the probability of non-detection, and wherein a fine estimation step is firstly carried out on a first group of symbols, during which a noise estimate is also made with a view to detecting false signals, then on another group of symbols, during which the noise estimate is also made in order to determine whether the synchronization acquisition is late and takes place outside a synchronization field, in which case the estimation step is stopped, and finally on the remaining number of symbols in order to improve the precision of the fine estimate.

* * * * *